J. McDONALD.
VEGETABLE STRAINER.
APPLICATION FILED JULY 16, 1909.

944,144.

Patented Dec. 21, 1909.
2 SHEETS—SHEET 1.

Witnesses

Inventor
John McDonald
By Victor J. Evans
Attorney

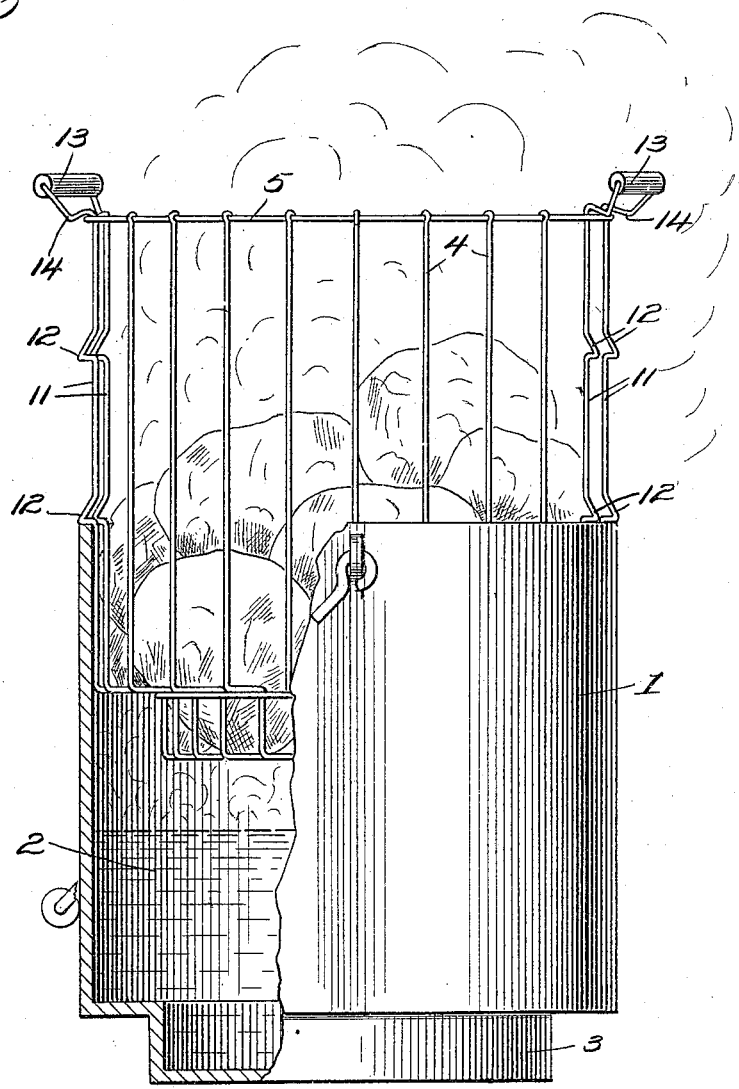

UNITED STATES PATENT OFFICE.

JOHN McDONALD, OF NORTH SYDNEY, NOVA SCOTIA, CANADA.

VEGETABLE-STRAINER.

944,144.

Specification of Letters Patent.  Patented Dec. 21, 1909.

Application filed July 16, 1909.  Serial No. 507,985.

*To all whom it may concern:*

Be it known that I, JOHN MCDONALD, a subject of the King of Great Britain, residing at North Sydney, in the Province of Nova Scotia, Cape Breton, and Dominion of Canada, have invented new and useful Improvements in Vegetable-Strainers, of which the following is a specification.

This invention relates to vegetable strainers, and one of the principal objects of the same is to provide an open-work wire basket designed to fit within a cooking utensil for containing vegetables, more particularly potatoes, turnips or vegetables of this kind, means being provided whereby the wire basket containing the vegetables may be suspended above the water in the cooking utensil after they have been properly cooked in order that they may be dry and mealy when ready to serve.

Another object of the invention is to provide an open-work wire basket adapted to fit various sizes of kettles or cooking utensils, said wire basket being provided with means for supporting it above the water in the cooking utensil so that the vegetables may be properly drained and also for the purpose of holding the basket in position to force the vegetables through the bottom thereof in order to slice or mash the vegetables after the water has been poured out of the cooking utensil.

These and other objects may be attained by means of the construction illustrated in the accompanying drawings, in which,—

Figure 1:
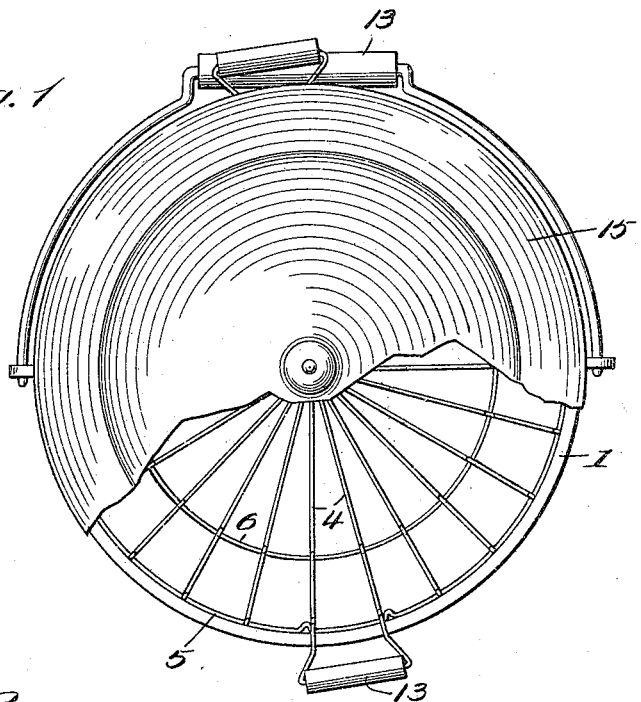
Figure 2:
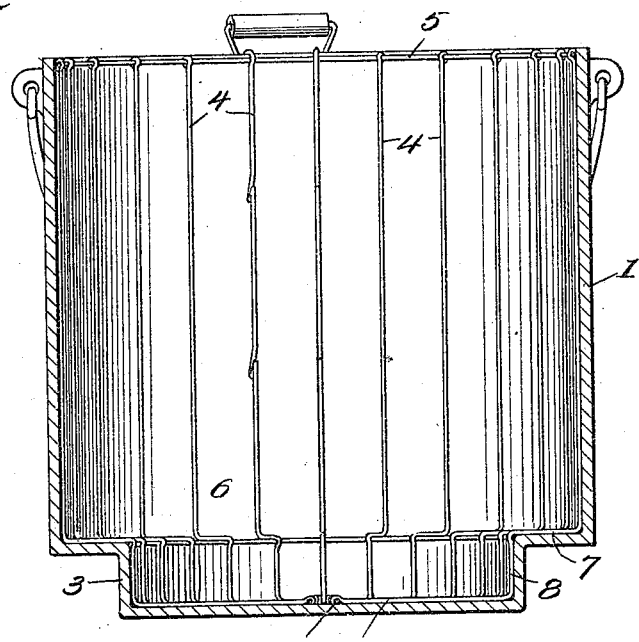

Figure 1 is a plan view of a cooking utensil containing a strainer made in accordance with my invention, the cover of the cooking utensil being broken away to illustrate a portion of the strainer. Fig. 2 is a vertical sectional view of the cooking utensil with the strainer disposed inside the same in position for use. Fig. 3 is an elevation and partial section of the cooking utensil, showing the wire strainer supported above the water in the cooking utensil in order that the potatoes shown in the strainer may be drained.

Referring to the drawings, the numeral 1 designates a kettle or other cooking utensil designed to contain a quantity of water 2. As shown, the cooking utensil is provided with a bottom portion 3 of reduced size designed to fit in the stove hole. However, this feature may be omitted, and an ordinary plain-bottom utensil utilized for my purpose.

The strainer is designed to fit within the kettle 1, and it consists of the ordinary wire strands 4 connected by a ring 5 at the top and a ring 6 at a point near the bottom, said strands 4 being provided with the inwardly bent portions 7, the downwardly bent portions 8 and the inwardly bent members 9 which are preferably united to a ring 10 in the center. The construction of the wire basket or strainer may be varied somewhat without departing from the spirit and scope of my invention. Resilient supporting strands 11 provided with projecting supports 12 are disconnected at their upper ends from the ring 5 and provided with suitable handles 13. The wire strands from which the members 11 are formed are provided with downwardly curved portions 14 to engage the wire ring 5 and to permit the handles to be raised and pushed inwardly to disconnect the supports 12 from the upper edge of the kettle 1 whenever it is desired to place the strainer within the kettle.

The operation of my invention may be briefly described as follows:—The potatoes or other vegetables are placed in the strainer, and the strainer is lowered into the kettle 1 to the bottom thereof within the water. After the vegetables have been properly cooked the strainer may be raised and supported upon the upper edge of the kettle 1 by the supports 12, thus suspending the vegetables above the water to permit them to drain and to permit the steam to escape from the vegetables. If it should be desired to mash the potatoes or to slice them the water 2 is poured out of the utensil 1, and the potatoes or other vegetables are forced through the bottom strands of the strainer into the receptacle 1, where they are kept hot until ready for use. A cover 15 fits the kettle 1 during the cooking operation.

From the foregoing it will be obvious that a strainer made in accordance with my invention may be of any required size to fit any desired kettle or cooking utensil, can be quickly raised out of the water and supported above the same for draining, and that the vegetables may be mashed or sliced by being forced through the bottom into the kettle to keep them warm until ready for serving.

I claim:—

The herein described vegetable strainer comprising a series of wire strands connected at their lower ends to a ring, a ring to which the upper ends of said strands are connected, supporting members comprising resilient wire strands connected to the lower ring and disconnected from the upper ring, said supporting members being provided with handles for operating the same and said supporting members having outwardly projecting supports designed to engage the upper edge of the kettle or cooking utensil.

In testimony whereof I affix my signature in presence of two witnesses.

JOHN McDONALD

Witnesses:
　WILLIAM E. SOMERS,
　ANNIE M. SOMERS.